US007676563B2

(12) United States Patent
Kothari et al.

(10) Patent No.: US 7,676,563 B2
(45) Date of Patent: Mar. 9, 2010

(54) TASK-ORIENTED MANAGEMENT OF SERVER CONFIGURATION SETTINGS

(75) Inventors: Nikhil Kothari, Sammamish, WA (US); Andrew Cheng-Min Lin, Seattle, WA (US); Joe Coulombe, Woodinville, WA (US); Angela M. Baxley, Bellevue, WA (US); Susan K. Todd, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 11/202,664

(22) Filed: Aug. 12, 2005

(65) Prior Publication Data

US 2007/0038733 A1 Feb. 15, 2007

(51) Int. Cl.
*G06F 15/173* (2006.01)
(52) U.S. Cl. ..................... 709/223; 715/736; 715/735; 715/733
(58) Field of Classification Search .......... 709/223; 715/736, 735, 733
See application file for complete search history.

(56) References Cited

U.S. PATENT DOCUMENTS 5,987,513 A * 11/1999 Prithviraj et al. ............ 709/223
6,662,221 B1 * 12/2003 Gonda et al. ................ 709/223
6,727,926 B1 * 4/2004 Utsuki et al. ................ 715/853
6,789,103 B1 * 9/2004 Kim et al. .................... 709/203
6,925,609 B1 * 8/2005 Lucke ......................... 715/804
2002/0055991 A1 * 5/2002 Arrouye et al. ............. 709/220
2002/0069272 A1 * 6/2002 Kim et al. .................... 709/221
2002/0149601 A1 * 10/2002 Rajarajan et al. ........... 345/619
2002/0178252 A1 * 11/2002 Balabhadrapatruni et al. ... 709/223
2002/0196277 A1 * 12/2002 Bushey et al. ............... 345/745
2003/0200288 A1 * 10/2003 Thiyagarajan et al. ...... 709/221
2003/0225867 A1 * 12/2003 Wedlake ..................... 709/222
2006/0085790 A1 * 4/2006 Hintermeister et al. ...... 718/100

* cited by examiner

*Primary Examiner*—William L Bashore
*Assistant Examiner*—Daeho D Song
(74) *Attorney, Agent, or Firm*—Merchant & Gould, P.C.

(57) ABSTRACT

Task-oriented management is provided for managing server configuration settings. The server configuration settings are logically grouped into a set of tasks. User interface elements are mapped to each task in the set of tasks. The task represented by a user interface element is also mapped to one or more of the server configuration settings. The task list is displayed that includes each of the mapped tasks. When a task is selected, a user interface page module is displayed. Using the user interface page module, the server configuration settings that correspond to the task are modified as the task is completed when the user selects corresponding actions as the user is guided through the task.

20 Claims, 8 Drawing Sheets

TASK-ORIENTED MANAGEMENT OF SERVER CONFIGURATION SETTINGS

BACKGROUND

Web sites are an integral part of an organization's operations. Web sites are used to actively promote companies and products, deliver services and information, manage transactions, and facilitate communications. One way in which web sites are managed is through the server that provides the web site content. A server is a computing device on a network that manages various network services. For example, a file server is a computing and storage device dedicated to storing files. A user on the network can store files on the file server. A print server is a computing device that manages one or more printers or other peripheral devices. A network server is a computing device that manages network traffic and allows for direction of traffic to various web sites.

Servers are often dedicated, meaning that they perform no other tasks besides their server tasks. On multiprocessing operating systems, however, a single computing device may execute several programs at once. A server in this case may refer to the program that is managing resources rather than the entire computer.

Regardless of the server type, a server is configurable by an administrator or other user to operate in a selected manner. A server may have thousands of server related configuration settings that may be selected to affect the server's performance. With the sheer number of server settings that may be adjusted, management of these server configuration settings may become difficult for users that do not possess an intimate knowledge the server's capabilities.

SUMMARY

Aspects of the present invention are generally related to providing a task-oriented management structure for managing server configuration settings. The task-oriented approach of the present invention provides the server configuration settings distributed into a set of tasks. It is the tasks that are exposed to the user, as opposed to the individual settings. The user is then able to select from the available tasks for manipulating the server configuration settings. For example, a task presented to the user may include "edit defaults". When the user selects this task, a user interface page module is provided that allows the user to select various actions that relating to editing the default settings. It may be that through the selection and action taken with relation to the task, more than one server configuration setting is modified. Allowing the server configuration settings to be manipulated through a set of tasks provides a more intuitive interaction for the user. The task-oriented approach also allows multiple configuration settings to be set even though the user may have only affected changes related to a single task.

In accordance with another aspect of the present invention, the task-oriented user interface may be optimized for a particular set of mainline scenarios or most popular tasks. The task-oriented interface is limited to providing the tasks that are used most often by users, or those referred to as "mainline tasks", while another advanced view is offered with all settings presented to the user to cover the more limited scenarios.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
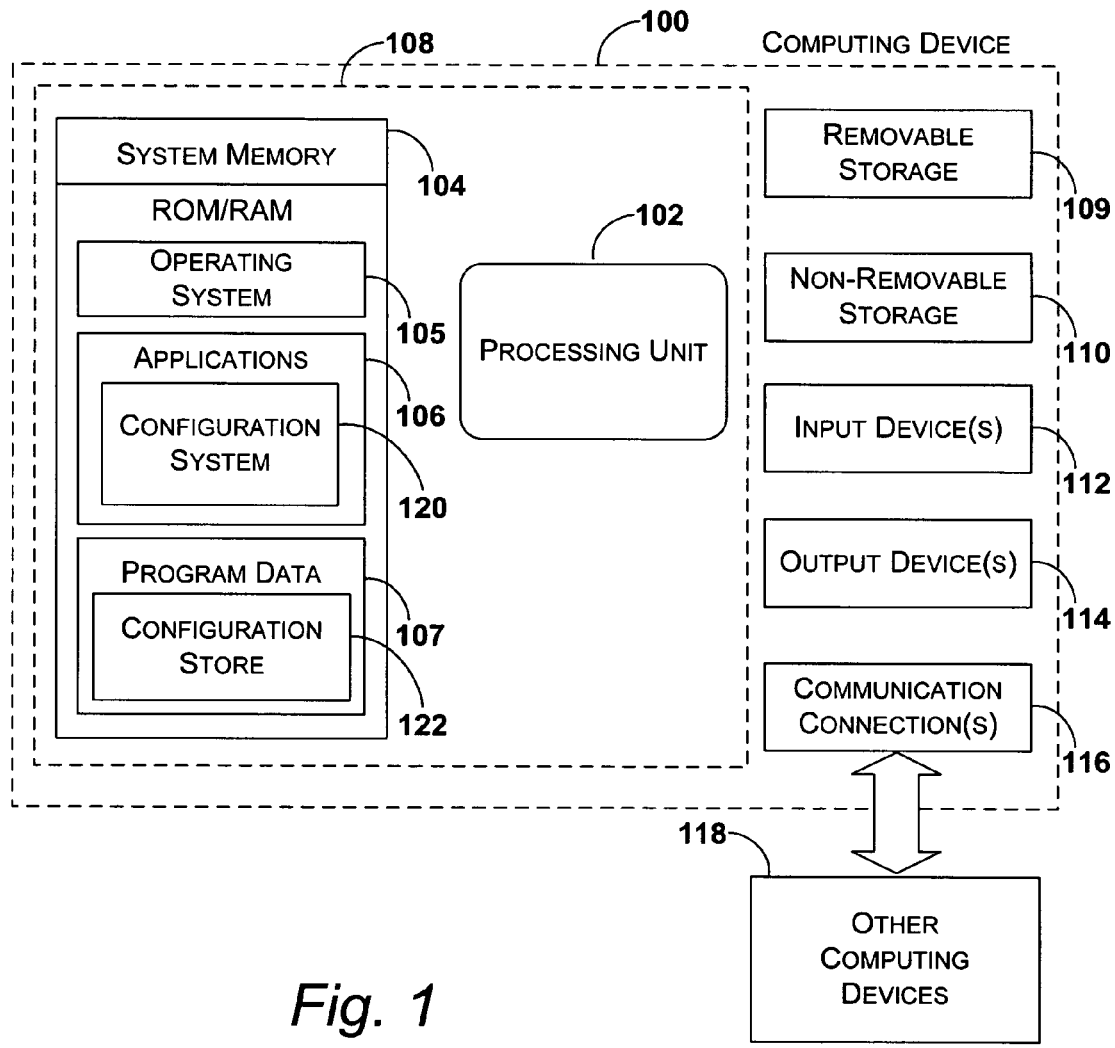
FIG. 1 illustrates an exemplary computing device that may be used in accordance with one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic embodiment, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107.

In one embodiment, application 106 includes a configuration system 120 for implementing the system of the present invention. Additionally, program data 107 includes configuration store 122 generated for a display object by the storage management application. This basic embodiment is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

An embodiment executed by computing device 100 provides for task-oriented management of server configuration settings. The server configuration settings are associated with a number of tasks that are provided to a user through a user interface. In one embodiment, the user interface corresponds to a task list (see FIG. 3) that lists each task the user may select. Selecting a task operates to instantiate a user interface page module that corresponds to one or more user interfaces of a wizard utility. These wizard interfaces (see FIGS. 4 and 5) guide the user through the task, allowing the user to make changes that affect the server configuration settings. For example, the user may select a task from the task list that corresponds to editing the logging configuration of the server. A first wizard interface is provided that allows the user to select modification actions (e.g., enable logging, etc.) to the logging configuration. More wizard interfaces may then be provided for additional modification actions (e.g., change log format, etc.) with respect to the logging configuration. The modification actions are translated into instructions for modifying a configuration store that includes the server configuration settings. Accordingly, the user is guided through a more intuitive process for managing the server configuration settings based on actions the user may wish to take with regard to the server operation. Also, by executing a single task, the user may affect a collection of interrelated server configuration settings, rather than having to address each setting individually.

Except for a broader meaning that allows the disclosure and claims herein to encompass a wider variety of alternative embodiments, the following terms as used herein and throughout the claims are defined as follows: a "task" generally refers to an action selectable by a user that allows the user to make modifications to a server configuration based on actions rather than editing the server configuration settings directly; "task list", "task pane", or "task toolbar" refer to a tool pane, tool bar, or other user interface window that includes a list of the tasks available for managing the server configuration; a "user interface page module" refers to the set of task specific user interfaces that are presented when a user selects a task to execute; a "mainline task" refers to a task that is included in a group of tasks related to server configuration settings that are found to be often selected, or popular tasks among users; "server configuration setting" refers to a settings that is associated with a server, network, web page, or other server-related resource; and "wizard interface" refers to at least one user interface window associated with a wizard utility that guides a user through a set of selections and actions.

Figure 2:
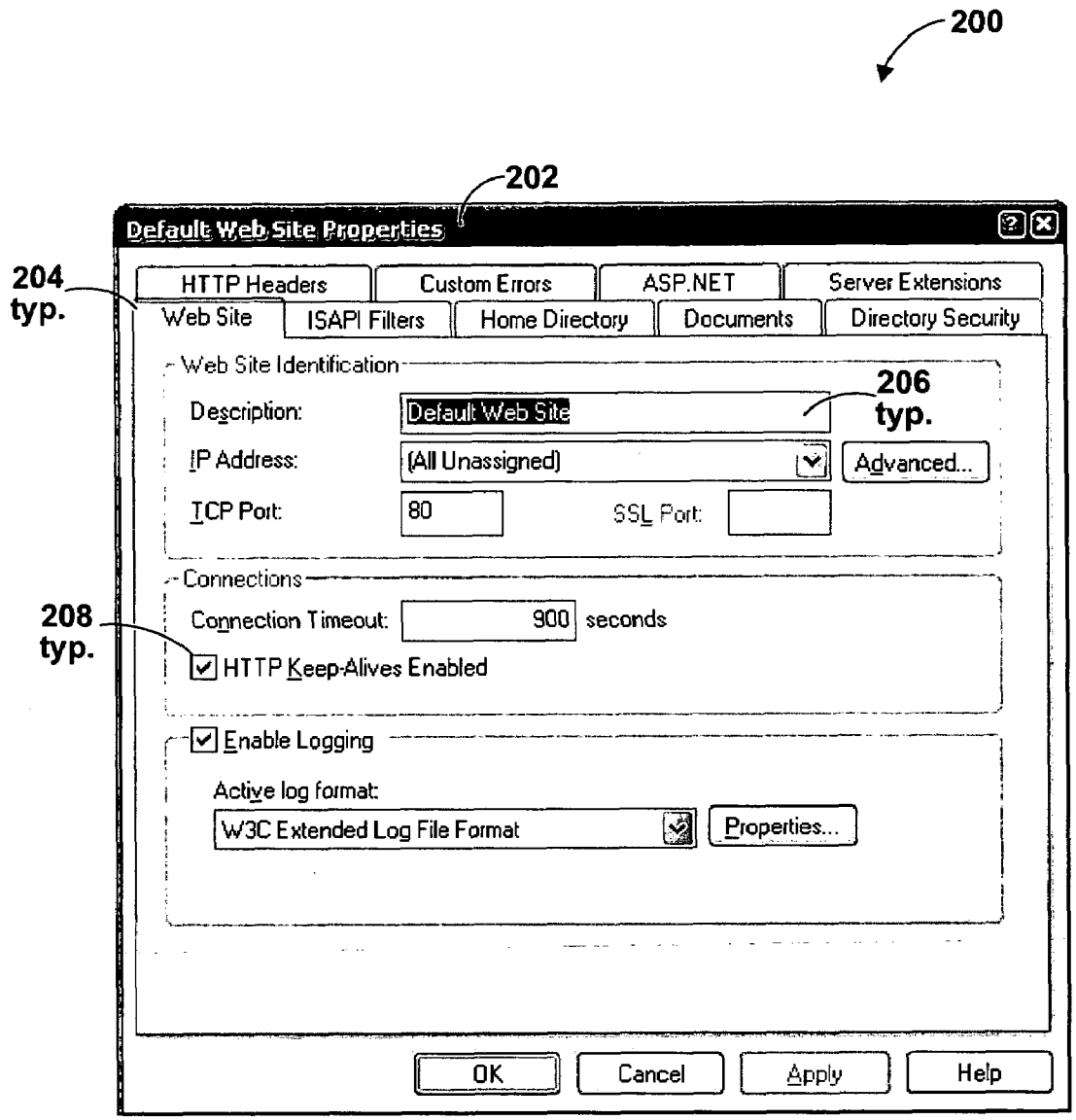
FIG. 2 is an example view of a previous server configuration management system.

FIG. 2 is an example view of a previous server configuration management system. Prior art system 200 illustrates a previous method for managing configurations settings. A user was presented with configuration window 202. Tabs (e.g., 204) were presented to the user for the various categories of server configuration settings that are available for the user to change. Fields (e.g., 206) or other types of entries were made available for the user to select and change a particular server configuration setting. Additionally, some settings have associated check boxes (e.g., 208) or other interactions for selecting and manipulating the server configuration settings.

For adjusting the setting, the user is forced to cycle through the tabs to find the server configuration settings that the user desires to change. Furthermore, the user is required to be aware of the outcome that will result from adjusting a particular setting. Otherwise, the user must "play" with the settings, adjusting settings at random or according to a best guess, to determine if the result desired is achieved by adjusting a setting.

Figure 3:
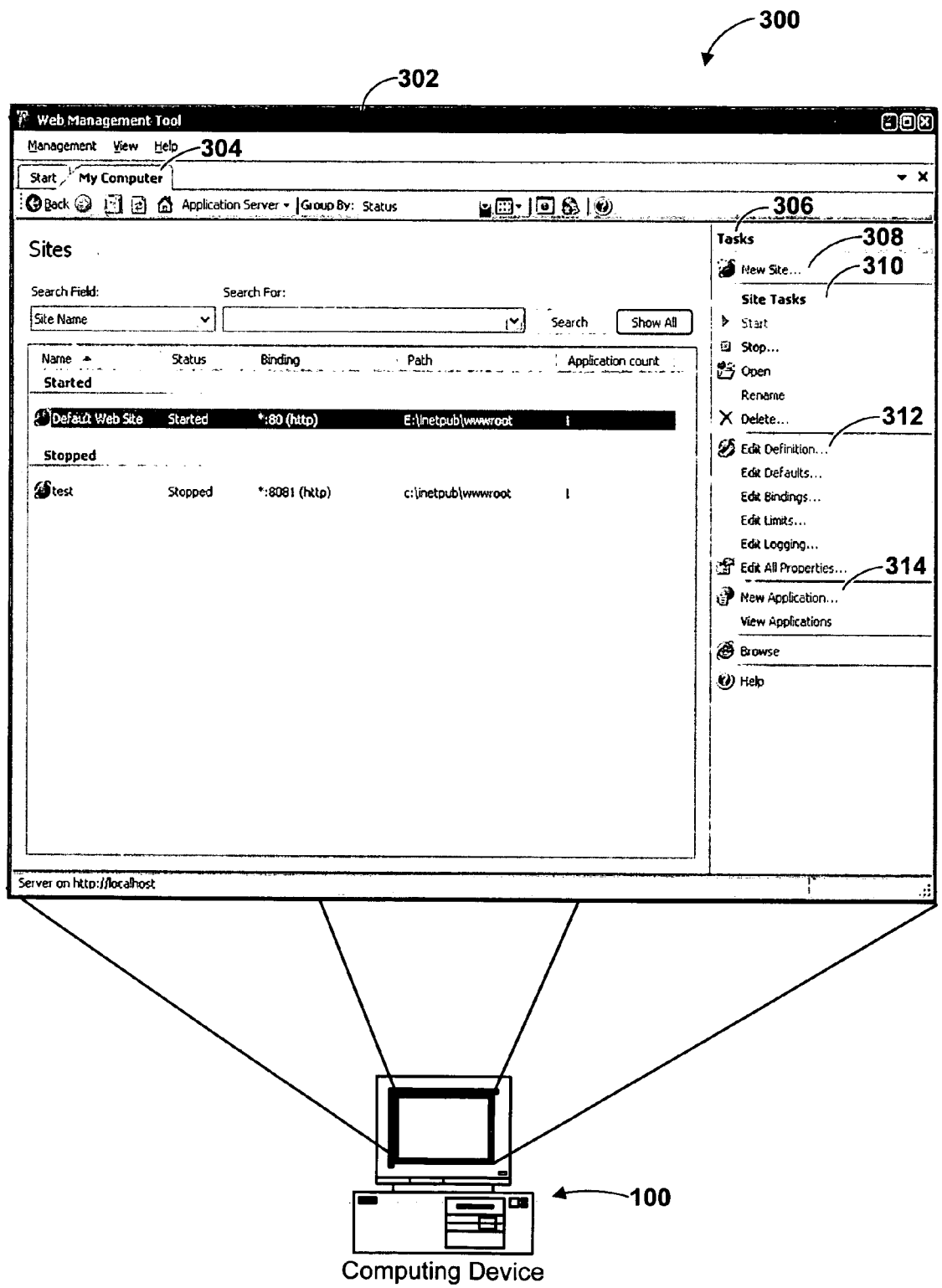
FIG. 3 is an exemplary embodiment of a user interface that illustrates a task list for managing server configuration settings.

FIG. 3 is an exemplary embodiment of a user interface that illustrates a task list for managing server configuration settings in accordance with one embodiment. User interface 300 is displayed on the display of computing device 100. User interface 300 includes title field 302, site manager field 304, and task list 306. Task list 306 includes application task sections 308 and 310, editing task section 312, and general task section 314.

Title field 302 provides a title for the associated application that is being utilized in user interface 300. In this particular example, the title for the associated application is "web management tool". As may be seen by examining site manager field 304, the web management tool is designed for creating and managing web sites that are provided according to the server. The tasks associated with the web management are included in task list 306.

Task list 306 includes application specific tasks such as those tasks included in application task sections 308 and 310. For example, one of the tasks listed is a "new site" task, and allows new site to be added to those provided in association with the web management tool. It is possible that server configuration settings may be affected by executing one of the application specific tasks, however, the server configuration settings are more likely to be mapped to one or more of the editing tasks.

Editing task section 312 includes a number of editing tasks associated with the web management application. The editing tasks have one or more of the server configuration settings mapped to the task. For example, with the "edit logging" task, server configuration settings such as the "LogRollover" and "LogFormat" settings may be mapped to the task. Additionally, the tasks may encompass various levels of action related to the task. Turning again to the "edit logging" task, the wizard interfaces provided for the task may be logically separated into a wizard interface for enabling logging, while another wizard interface is provided for configuring the frequency and format associated with the logging. The wizard interfaces are discussed further below with regard to FIGS. 4 and 5.

General task section 314 includes tasks such as "new application", "browse", and "help". These types of general tasks are fairly well-known and allow the new tasks available for adjusting the server configuration settings to be associated in a single task list rather than providing them separately.

Although tasks list 306 is shown as provided in a pane on the right side of user interface 300, it is appreciated that task list may be provided according to different positions and orientations on the display. Additionally, tasks list 306 may be provided according to its own window, rather than integrated with another application as shown in FIG. 3.

In one embodiment, the tasks shown in task list 306 correspond to mainline tasks. The mainline tasks are selected for display because these are the task determined to be the most popular tasks with users. When the server configuration settings are organized into tasks, certain tasks are simply more used than other tasks. When a user is performing a mainline task, they can simply select the task from task list 306. Alternatively, when a user is performing a less used task, the user may select the advance view or "edit all properties" task that provides a comprehensive list of the server configuration settings. With the comprehensive list, the user is able to select and modify individual server configuration settings for completion of the task.

Figure 4:
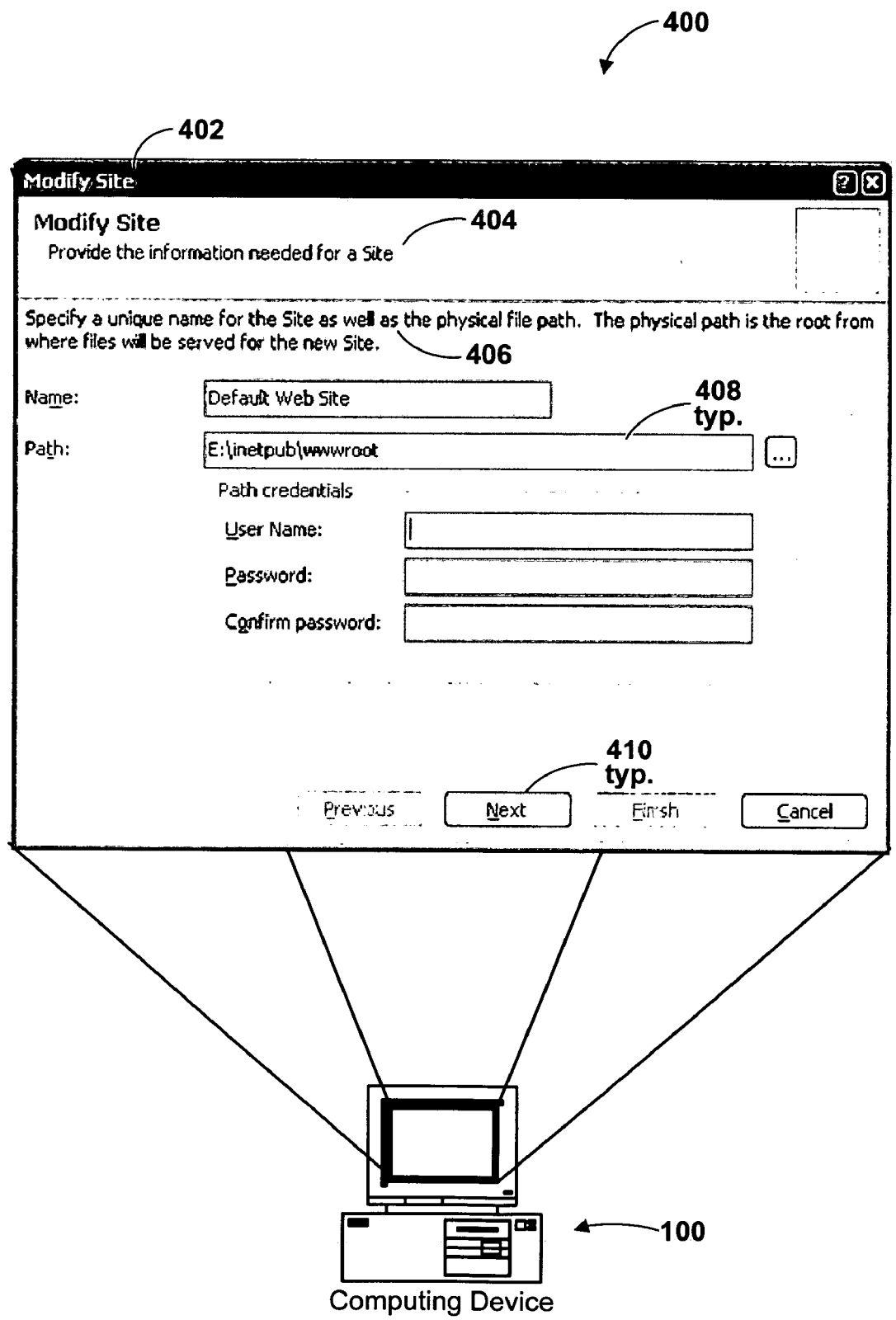
FIG. 4 is an exemplary embodiment of a user interface provided according to a selected task.

FIG. 4 is an exemplary embodiment of a user interface provided according to a selected task in accordance with one embodiment. User interface 400 is displayed on the display of computing device 100. User interface 400 corresponds to a wizard interface that provides a page of the wizard utility for executing a specific task. User interface 400 includes title field 402, task label 404, action description 406, one or more data fields (e.g., 408), and one or more navigation fields (e.g., 410).

In the example shown, the task corresponds to a "modify site" task as provided in title field 402. Task label 404 describes the task selected to the user so that the user generally realizes the functions to which this interface of the task relates. Action description 406 describes the actions that may be performed with relation to user interface 400. For example, user interface 400 shown allows the user to modify the site by specifying a unique name for the site as well the physical file path. Action description 406 also provides a description of what the physical file path encompasses.

The group of data fields shown (e.g., 408) are provided for entering the information related to the site modification. One or more of these fields may correspond to server configuration setting. In one embodiment, a modification action or manipulation that occurs in one of the fields (e.g., 408) results in a modification to a server configuration setting. In another embodiment, a modification action or manipulation that occurs in one of the fields (e.g., 408) results in a modification to multiple server configuration settings. For example, a change to the web site path name results in a change to the server configuration setting corresponding to identification of the web site.

Once any modifications are made in user interface 400, the user may navigate to other wizard interfaces provided by the wizard utility. The user may navigate through the wizard interfaces using a variety of navigation fields (e.g., 410). The user may move on to the next interface (e.g., see user interface 500 of FIG. 5), or any previous interfaces as desired. Furthermore, the user may select to finish the task directly from user interface 400, or possibly cancel any modification actions made.

Additional embodiments provide for additional or fewer data fields associated with a particular task. Additionally, more than one modification action may be associated with each wizard interface provided by the wizard utility. Some modification actions may affect the server configuration settings while others do not. Furthermore, the number of wizard interfaces provided to complete the tasks is limited to particular number or variety.

Figure 5:
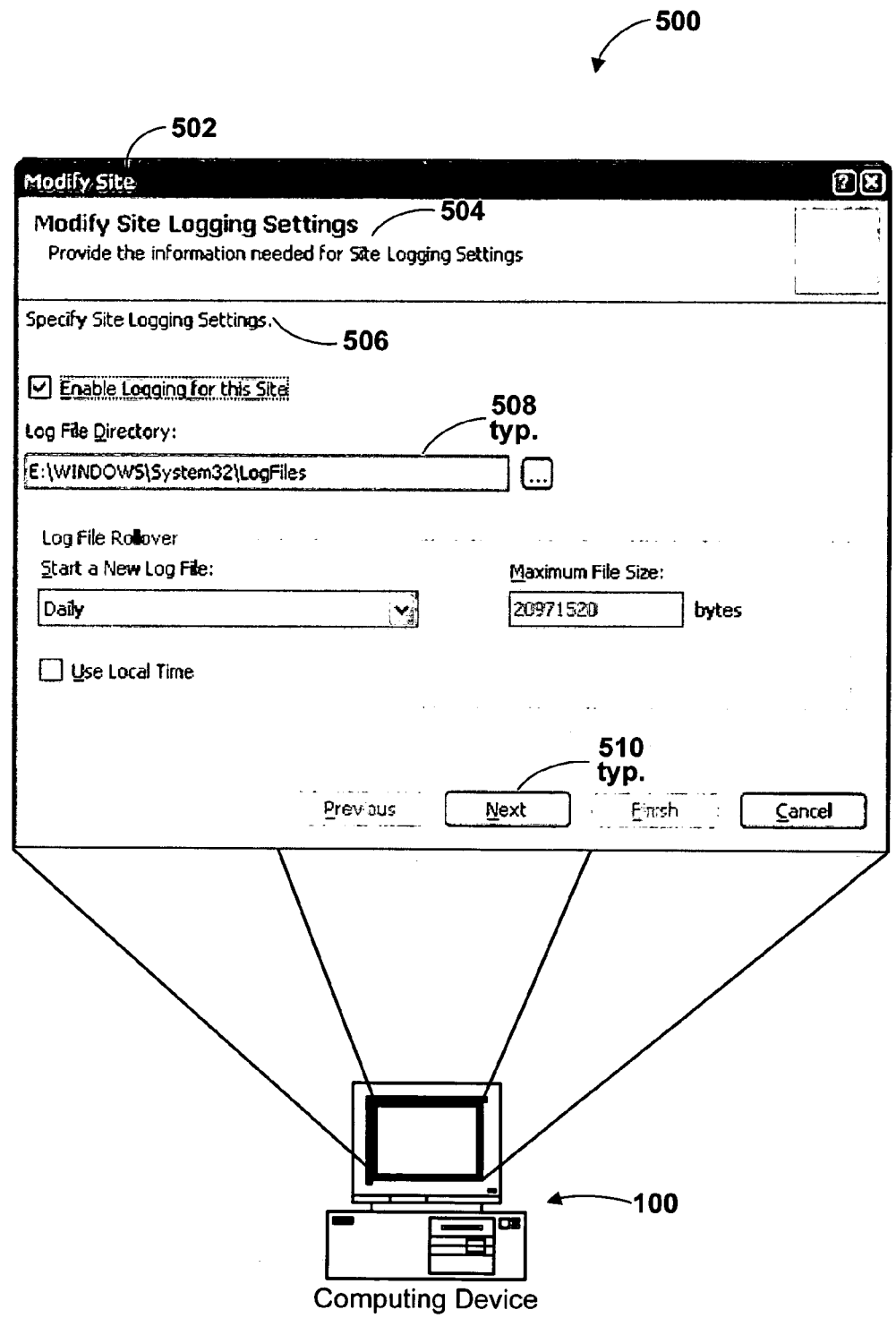
FIG. 5 is an exemplary embodiment of another user interface provided according to the selected task.

FIG. 5 is an exemplary embodiment of another user interface provided according to the selected task in accordance with one embodiment. User interface 500 is displayed on the display of computing device 100. User interface 500 corresponds to a wizard interface that provides a page of the wizard utility for executing a specific task. User interface 500 includes title field 502, task label 504, action description 506, one or more data fields (e.g., 508), and one or more navigation fields (e.g., 510).

In the example shown, title field 502 indicates that the task corresponds to the "modify site" task described in FIG. 4. Task label 504 however describes a different task related to site logging settings rather than providing information needed for the site in general. Action description 506 also contrasts to FIG. 4 in that action description 506 indicates that user interface is arranged to allow the user to specify the site logging settings.

In one embodiment, user interface 500 represents a wizard interface provided according to the same user interface page module that corresponds to user interface 400 shown in FIG. 4. In another embodiment, user interface 500 corresponds to a new task associated with a user interface page module that is separate from the module associated with user interface 400. For example, in FIG. 3, task list 306 illustrates an "edit definition" task that may correspond to user interface 400 and additionally an "edit logging" task that may correspond to user interface 500.

Each user interface (e.g., 400 and 500) is provided corresponding to a user interface page module. The user interface page module corresponds to the set of wizard interfaces provided by a wizard utility. Providing the user interfaces according to the sequential organization of a wizard utility allows the user to be guided through the task, simplifying the process for the user.

Figure 6:
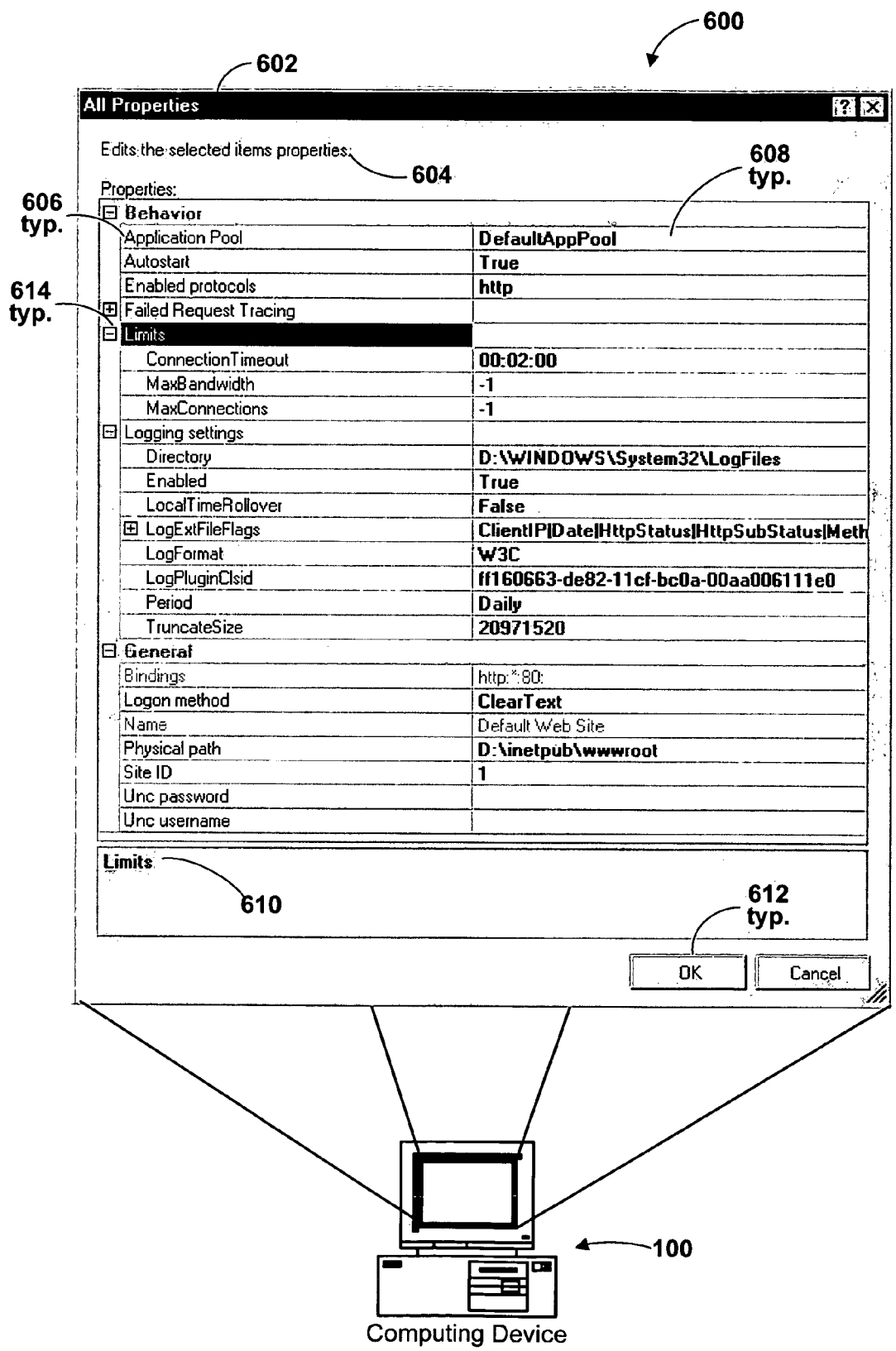
FIG. 6 is an exemplary embodiment of another user interface provided according to an advance view task.

FIG. 6 is an exemplary embodiment of another user interface provided according to an advance view task in accordance with one embodiment. User interface 600 is displayed on the display of computing device 100. User interface 600 includes title field 602, task label 604, one or more server configuration settings (e.g., 606), one or more corresponding setting values (e.g., 608), setting description field 610, and a confirmation field (e.g., 612).

Title field 602 and task label 604 operate similarly to the title fields (402, 502) and task labels (404, 504) shown in FIGS. 4 and 5. Title field 602 provides a short title of the task, while task label 604 generally describes the task. For user interface 600, the task corresponds to editing one or more of the properties or server configuration settings associated with a web site. The left column lists the server configuration settings (e.g., 606), while the right column lists the setting's value (e.g., 608). Any one of the settings may be changed by the user.

In one embodiment, the server configuration settings are further hierarchically organized using setting categories (e.g., 614). For example, setting category 614 corresponds to a category of settings associated with "limits".

Once the user has made any modifications to the settings, or otherwise desires to exit the task corresponding to the comprehensive list of the server configuration settings, the user may select one of the confirmation fields (e.g., 612). In one embodiment, selecting one of the confirmation fields accepts or cancels the modification actions made during execution of the task.

Figure 7:
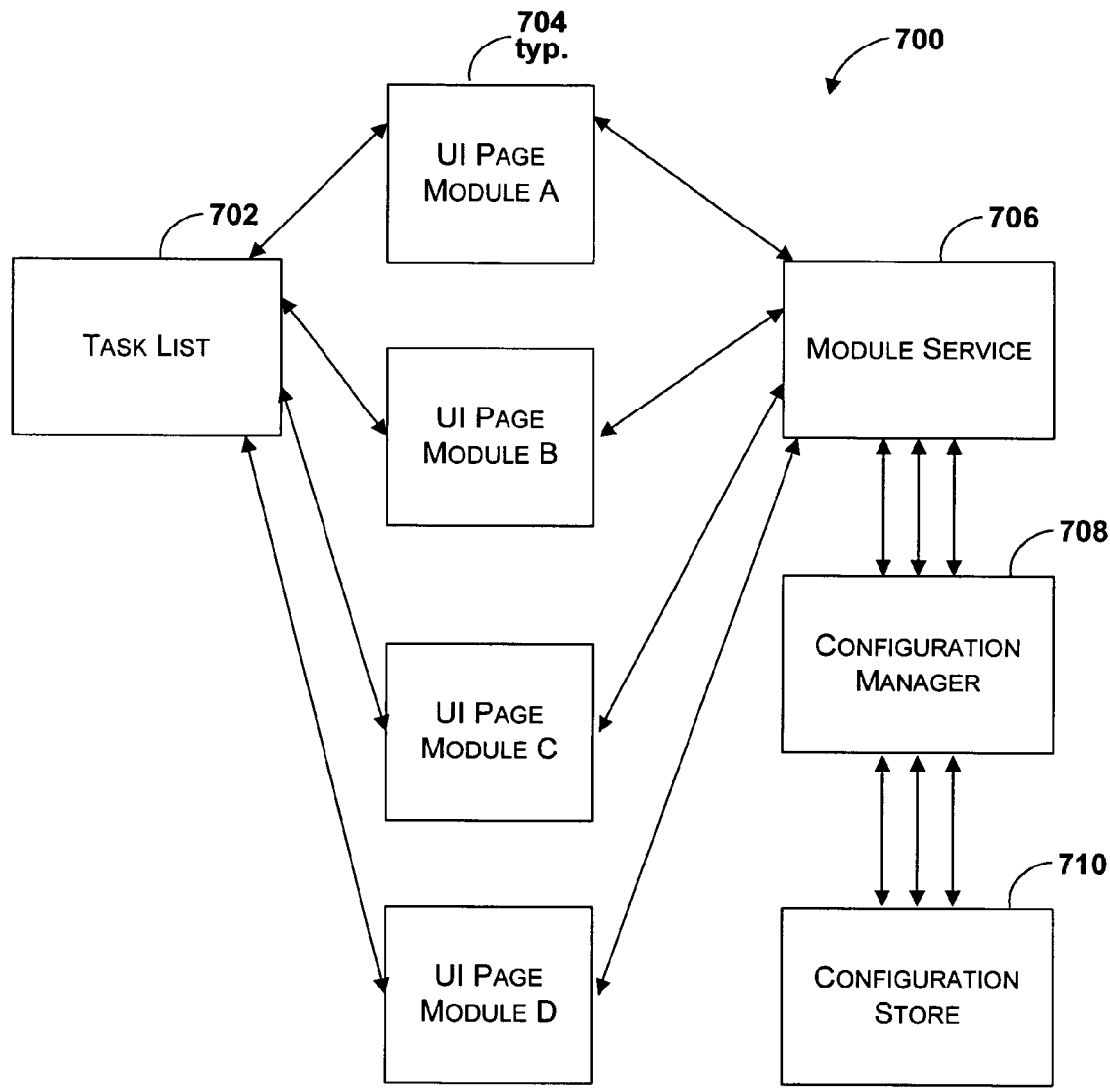
FIG. 7 is a functional diagram of an exemplary system for task-oriented management of server configuration settings.

FIG. 7 is a functional diagram of an exemplary system for managing reusable content fragments, in accordance with an embodiment of the present invention. System 700 includes task list 702, one or more user interface page modules (e.g., 704), module service 706, configuration manager 708, and configuration store 710.

When a task is selected from task list 702 for execution, module service 706 instantiates the user interface page module (e.g., 704) corresponding to the selected task. As the user executes the tasks and performs modification actions during completion of the task, the module service translates the modification actions into instructions understood by configuration manager 708. Configuration manager 708 manages configuration store 710. Configuration store 710 is the storage location for the configuration file that includes the server configuration settings associated with a particular server resource. In one embodiment, configuration store 710 is an extensible markup language (XML file) arranged to store the server configuration settings. Configuration manager 708 processes the instructions provided by module service 706 to modify and edit the server configuration settings included in configuration store 710. For example the setting modified may correspond to a logging setting. The portion of configuration store 710 modified may be similar to the following general XML:

```
<configuration>
    <...>
        <sites>
            <sitename = www.example.com>
                <logging LogRollover = "..."/>
                .
                .
                .
</configuration>
```

In an additional embodiment, one of the user interface page modules (e.g., 704) corresponds to a task that displays the comprehensive list of the server configuration settings. The task may be referred to as an advance view task or edit all properties task. The user interface provided according to the user interface page module may also be referred to as an advance view of the settings.

Figure 8:
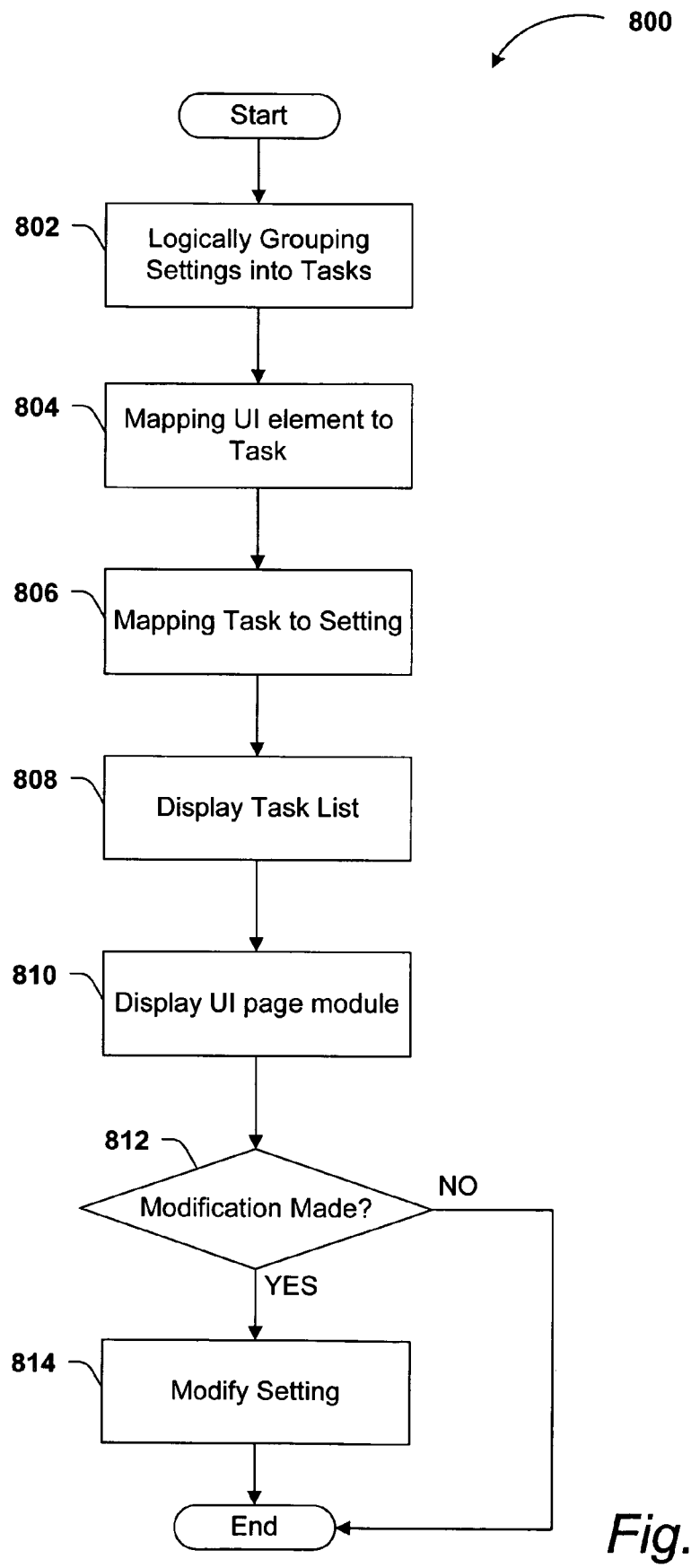
FIG. 8 is a flow diagram representing an exemplary embodiment for rendering a reusable content fragment, in accordance with one embodiment of the present invention.

FIG. 8 is a flow diagram representing an exemplary embodiment for rendering a reusable content fragment, in accordance with one embodiment of the present invention. When process 800 starts, a server resource is associated with one or more server configuration settings. Processing then continues with read grouping operation 802.

Grouping operation 802 logically groups the settings into tasks. A variety of tasks, from very specifically defined tasks to very broadly defined tasks, may be associated with the server configuration settings. More than one server configuration settings may be associated with each task. Additionally, a server configuration setting may be associated with more than one task. Once the server configuration settings are grouped into tasks, processing continues to element mapping operation 804.

Element mapping operation 804 maps the task to a user interface element included on a displayed user interface. In one embodiment, the displayed user interface corresponds to a task list that provides a list of the tasks available to the user. In one embodiment, the tasks that are displayed are those tasks considered mainline or core tasks. The mainline tasks correspond to task considered more frequently used. The user interface element may correspond to one or more words with an associated link, icons, or other visual indicators of the task. Once the task is mapped to a user interface element, processing continues at setting mapping operation 806.

Setting mapping operation 806 maps the task represented by the user interface element to one or more of the server configuration settings. In one embodiment, the module service (e.g., 706 of FIG. 7) maps task provided to the current state of the server configuration settings in the configuration store (e.g., 710). Therefore, when a user interface page module is displayed, the fields in the set of user interfaces corresponding to the module are populated with the current values associated with the associated server configuration settings. Furthermore, when the module resource receives notification that a modification was made, the module service also knows which server configuration setting the modification affects. Once each task is mapped to the appropriate server configuration settings, then processing continues with display task list operation 808.

Display task list operation 808 displays the task list to the user to allow selection of one of the tasks. The task list may be displayed according to any orientation or position on the screen. Furthermore, the task list may be associated with its own display window or be displayed concurrently with another application such as a web site management application. Once the task list is displayed, processing continues at display user interface page module operation 810.

Display user interface page module operation 810 displays a user interface page module that corresponds to a selected task when one of the tasks is selected. The user interface page module displayed is dependent on the task. In one embodiment, each user interface page module is different for each task. Additionally, the user interface page module may correspond to a set of wizard interfaces provided by a wizard utility. In an additional embodiment, when the task corresponds to an advance view task, the user interface page module corresponds to a user interface that displays a comprehensive list of the server configuration settings. While the user interface page module is displayed, processing moves to determination operation 812.

Determination operation 812 determines whether a modification was made during the execution of the task. For example, a field within one of the wizard interfaces may have its value modified (e.g., the enable logging checkbox is checked). If no such modification occurs, process 800 ends, and processing moves onto other tasks for handling the tasks or modifying the server operation.

However, if such a modification is made during the execution of the task, then processing continues with a modification operation 814. Modification operation 814 modifies the server configuration setting with the configuration store. The server configuration setting is updated to reflect the modification that occurred during completion of the task. Once the server configuration settings is updated, process 800 ends and processing moves onto other tasks for handling the tasks or modifying the server operation.

Process 800 is not limited to the operations herein described, but may include other, additional, or fewer operations for providing task-oriented management of server configuration settings. Furthermore, process 800 may be modified so that the order of operations shown may be rearranged during actual implementation of the process.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for providing task-oriented management of server configuration settings, the method comprising:
    logically grouping the server configuration settings into a set of tasks; wherein the set of tasks comprises: general tasks and editing tasks; wherein each of the editing tasks maps to one or more the server configuration settings; wherein changing one or more of the server configuration settings affect a server's performance; wherein the editing tasks include an edit defaults setting task and an edit all properties task that include a list of all of the server configuration settings that is arranged to individually modify server configuration settings; and wherein each editing task allows a user to make modifications to one or more of the associated server configuration settings;
    mapping a user interface element to a task in the set of tasks;
    mapping the task represented by the user interface element to a server configuration setting;
    displaying a task list that includes at least the user interface element; wherein the displayed task list displays the general tasks and the editing tasks within a first window such that each of the tasks that are logically grouped are selectable from within the first window; wherein the tasks are arranged according to a frequency of use;
    displaying a user interface page module in response to a selection of the task; and
    modifying the server configuration setting when completion of the task through the user interface page module involves a change to the server configuration setting.

2. The computer-implemented method of claim 1, wherein the task corresponds to an advance view task that provides a comprehensive list of the server configuration settings when selected.

3. The computer-implemented method of claim 1, wherein the user interface page module corresponds to a wizard interface, such that the user interface page module is configured to display sequential user interface windows to facilitate completion of the task.

4. The computer-implemented method of claim 1, wherein completion of the task modifies additional server configuration settings also mapped to the task.

5. The computer-implemented method of claim 1, further comprising storing the server configuration setting in a configuration store that corresponds to an extensible markup language file.

6. The computer-implemented method of claim 5, further comprising modifying the server configuration setting by modifying a portion of the extensible markup language file, wherein the portion of the extensible markup language file corresponds to the server configuration setting.

7. The computer-implemented method of claim 1, further comprising managing modification actions made during completion of the task by communicating the modification actions to a configuration manager.

8. The computer-implemented method of claim 1, wherein the task corresponds to a mainline task for managing a server.

9. A computer-readable storage medium having stored thereon instructions that when executed implements the computer-implemented method of claim 1.

10. A system for providing task-oriented management of server configuration settings, comprising:
    a memory, the memory being allocated for a plurality of computer-executable instructions which are loaded into the memory for execution by the processor, the computer-executable instructions performing a method comprising:
    a task list that is displayed according to a user interface within a first window, wherein the task list includes user interface elements that are each mapped to a task; wherein the task list includes a list of tasks that are directed at manipulating one or more server configuration settings when executed; and wherein the task list is logically grouped into editing tasks and general tasks that are displayed and selectable within the first window; wherein changing one or more of the server configuration settings affect a server's performance; wherein the editing tasks include an edit defaults setting task and an edit all properties task that include a list of all of the server configuration settings that is arranged to modify individual server configuration settings; and wherein each editing task allows a user to make modifications to one or more of the associated server configuration settings;
    a configuration store that is arranged to store the configuration settings in memory;
    user interface page modules that are displayed in response to selection of one of the user interface elements, wherein the user interface page module is configured to provide manipulation of at least one of the configuration settings when completion of the task indicates the manipulation action occurred; wherein the tasks are arranged according to a frequency of use;
    a module service that is arranged to translate the manipulation action into a modification instruction; and
    a configuration manager that is configured to execute the modification instruction and modify the server configuration setting that is stored in the configuration store.

11. The system of claim 10, wherein the configuration store is arranged as an extensible markup language file.

12. The system of claim 10, wherein the user interface page module corresponds to an interface wizard configured to display sequential user interface windows to facilitate completion of the task.

13. The system of claim 10, wherein the user interface page module corresponds to an advanced view task, such that display of the user interface page module displays a comprehensive list of the server configuration settings.

14. The system of claim 10, wherein the modification instruction provided by the module service instructs the configuration manager to modify more than one server configuration setting in response to a modification action made during completion of the task.

15. The system of claim 10, wherein the task list is arranged to include the mainline tasks associated with managing server configuration settings.

16. A computer-readable medium having stored thereon instructions that when executed implements the system of claim 10.

17. A computer-readable storage medium having stored thereon computer-executable instructions for providing task-oriented management of server configuration settings, the computer-executable instructions comprising:

displaying a task list in a user interface within a first window, wherein the task list corresponds to a set of tasks and wherein each task of the set of tasks is mapped to one or more of the server configuration settings; wherein the tasks displayed within the first window map to all of the server configuration settings to be managed; wherein changing one or more of the server configuration settings affect a server's performance;

wherein the set of tasks include an edit defaults setting task and an edit all properties task that include a list of all of the server configuration settings that is arranged to individually modify server configuration settings;

displaying a user interface page module in response to a selection of a task in the task list; wherein the tasks are arranged according to a frequency of use;

providing an instruction to a configuration manager in response to a modification action that occurs during completion of the task, wherein the instruction corresponds to a change of at least one of the server configuration settings; and modifying the server configuration setting that corresponds to the instruction in a configuration storage, such that the server configuration setting reflects a state of the server after completion of the task.

18. The computer-readable storage medium of claim 17, wherein the computer-executable instructions further comprise modifying more than one configuration setting in response to the instruction received by the configuration manager.

19. The computer-readable storage medium of claim 17, wherein the computer-executable instructions further comprise displaying a comprehensive list of the server configuration settings when the user interface page module corresponds to an advance view task.

20. The computer-readable storage medium of claim 17, wherein the computer-executable instructions further comprise selecting the tasks included in the task list to correspond to the mainline tasks for managing a server.

* * * * *